United States Patent
Grafen

(10) Patent No.: US 6,626,094 B1
(45) Date of Patent: Sep. 30, 2003

(54) FILTER PRESS WITH A STACK OF VERTICALLY ALIGNED, HORIZONTALLY DISPLACEABLE FILTER PLATES

(75) Inventor: Karl Grafen, Wuerselen (DE)

(73) Assignee: Outokumpu Oyj, Espoo (FI)

( * ) Notice: Subject to any disclaimer, the term of this patent is extended or adjusted under 35 U.S.C. 154(b) by 0 days.

(21) Appl. No.: 10/111,153

(22) PCT Filed: Oct. 20, 2000

(86) PCT No.: PCT/DE00/03687

§ 371 (c)(1), (2), (4) Date: Apr. 19, 2002

(87) PCT Pub. No.: WO01/30475

PCT Pub. Date: May 3, 2001

(30) Foreign Application Priority Data

Oct. 28, 1999 (DE) .......................... 199 51 904

(51) Int. Cl.[7] .............................. B30B 7/02; B01D 29/62
(52) U.S. Cl. ................... 100/200; 100/204; 210/230
(58) Field of Search .................... 100/232, 193, 100/194, 195, 200, 202, 204–205; 210/224–231

(56) References Cited

U.S. PATENT DOCUMENTS 329,551 A * 11/1885 Hamilton .................... 100/200
569,920 A * 10/1896 Hubbell ...................... 100/200
3,968,040 A * 7/1976 Ostrop ........................ 210/225
4,486,306 A * 12/1984 Busse et al. ................. 210/230

FOREIGN PATENT DOCUMENTS

| CH | 451091 | 5/1968 |
| DE | 4325055 | 2/1995 |
| DE | 4428963 | 12/1995 |
| DE | 19951904 | 2/2001 |

* cited by examiner

Primary Examiner—Allen Ostrager
Assistant Examiner—Jimmy Nguyen
(74) Attorney, Agent, or Firm—W. F. Fasse; W. G. Fasse

(57) ABSTRACT

In a filter press, a stack of vertically oriented, horizontally displaceable filter plates enclose filter chambers therebetween. The filter plates are successively moved relative to each other from a closed pressing position, through a pressure relief position, to an open discharge position. At least one connecting element is connected to each filter plate, and is movably coupled to the respective adjacent filter plate by a coupling pin, which slides in a specially configured groove of the connecting element. In the relief position, a respective coupling pin is stopped against an intermediate blocking surface of the groove of the connecting element of the next adjacent filter plate, thereby preventing further horizontal displacement. By unlatching the connecting element, the coupling pin can then slide to a stop surface of the groove, to allow the adjacent filter plates to be displaced farther into the open discharge position.

15 Claims, 3 Drawing Sheets

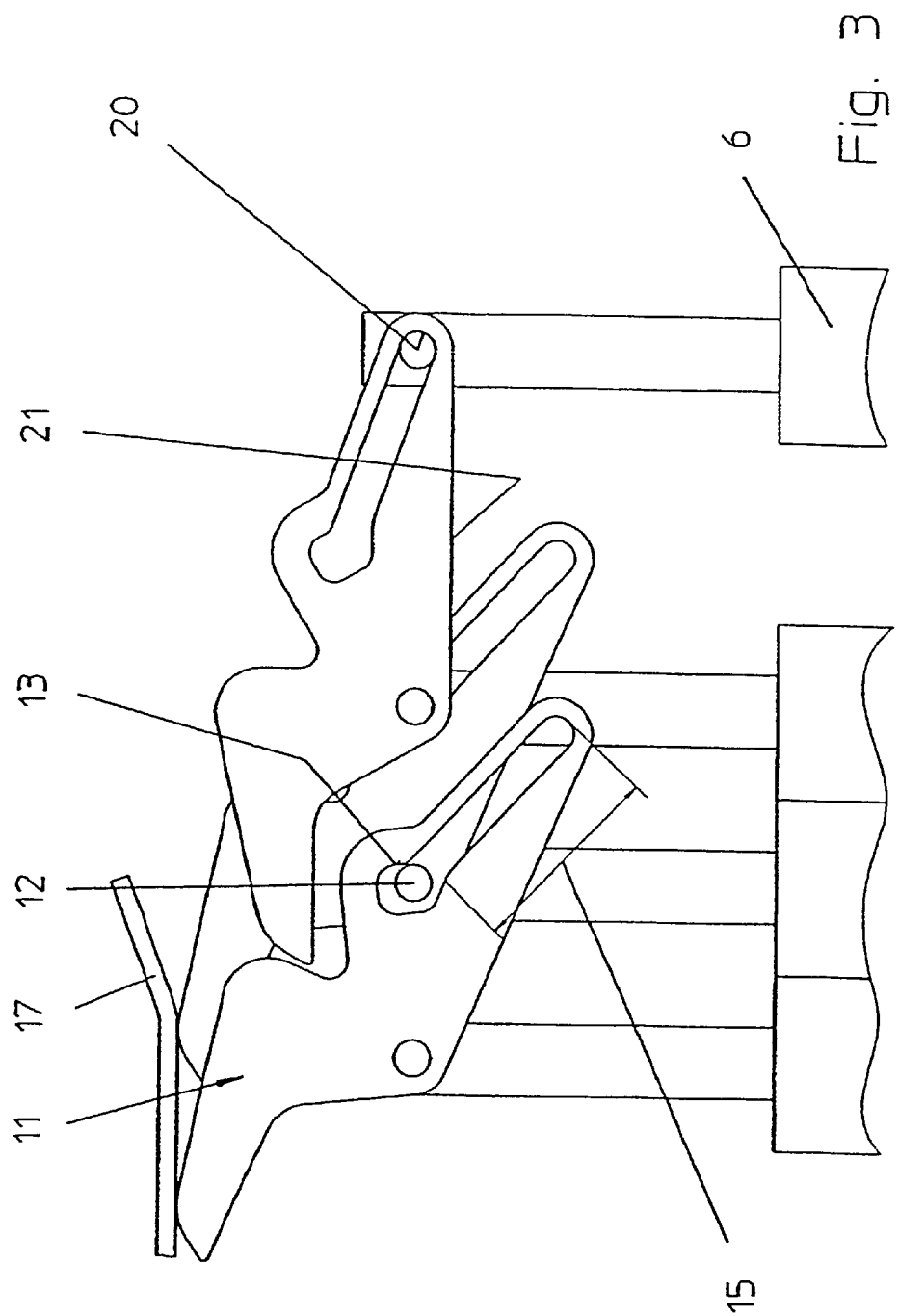

FILTER PRESS WITH A STACK OF VERTICALLY ALIGNED, HORIZONTALLY DISPLACEABLE FILTER PLATES

FIELD OF THE INVENTION

The invention relates to a filter press with a stack of vertically oriented or aligned, horizontally displaceable filter plates. Adjacent one of the filter plates are mutually coupled via at least one connecting element each. A respective filter chamber is defined between adjacent ones of the filter plates. The filter plates lie against one another with sealing edges in a pressing position of the stack of filter plates, and are displaceable successively to a discharge position by the horizontal displacement of at least one filter plate, in which discharge position the horizontal distance of adjacent filter plates is limited by the action of a coupling element of a filter plate on a stop surface of the connecting element of an adjacent filter plate.

BACKGROUND INFORMATION AND RELATED ART

Such a filter plate is known from DE 44 28 963 C1 for example. The connecting elements are arranged as levers which are swivelably held on laterally projecting projections of the filter plates. The levers are provided with two arms each, namely an arm with a holding hook which with respect to the opening direction is at the rear and is latched behind the projection of the next filter plate at the rear in the pressing or filtering position. Moreover, the levers comprise a front arm which is provided with a control surface which during the movement away of the next filter plate at the front, once the same has moved away over a predetermined path, produces a swiveling movement of the lever by cooperating with its projection and during which its holding hook detaches from the projection of the next filter plate at the rear. In this process the control surface encloses a recess in the hook-like front arm of the lever in which the projection of the next filter plate at the front is continually received and is provided at its base with the stop surface for fixing, i.e. limiting the plate distance in the discharge position.

The levers thus fulfill a double function by mutually locking the adjacent filter plates based on the pressing position on the one hand and thus preventing that swelling filter cake will lead to the expulsion of such filter plates which should not yet be emptied, and by acting as connecting elements on the other hand which in the discharge position of the filter plates define their maximum distance with respect to one another.

A typical aspect for the known filter press is the sequential emptying of only one filter chamber successively, with the as yet unemptied filter chambers remaining mutually locked until immediately before the discharging process. The known filter press is not suitable for discharging principles in which a section of the stack consisting of a plurality of filter plates is to be unlocked simultaneously, since the unlatching of the filter plates can always only occur successively.

From DE 43 25 055 A1 a filter press is known whose filter plates are mutually chained together by brackets and connecting links. Whereas the brackets are swivelably held on a filter plate, the connecting brackets connect one each of the brackets with an adjacent filter plate in a flexible way. A hook is each arranged on the brackets which latches into projections on the filter plates when the filter plates are pushed together into a stack. The joints between the brackets and the connecting links are disposed in such a way that when two adjacent filter plates are pulled apart the hook which is latched into the projection of the next following filter plate will detach from this projection to the amount to which the bracket which belongs to said hook with the connecting link pulling the same assumes a stretched position. It is to be prevented in this way that intermediate spaces will open prematurely between the filter plates during the opening of the filter press in which emerging filter cakes could get stuck.

If the plate stacks were opened in sections in this known filter plate it is also not ensured in this case that the discharge distance between adjacent plates in all sections would be of the same size because a relief of the sealing edges decreases continually with rising distance of the filter plate from the movable head plate prior to the pulling apart of the stack of plates after the relief, i.e. removal of the locking pressure.

SUMMARY OF THE INVENTION

The invention is based on the object of further developing a filter press in such a way that during a sequential discharge of complete sections of the stack of plates, always the same discharge distance of adjacent filter plates can be achieved during the discharge of all sections. The connecting elements should simultaneously comprise a latching function for the filter plates of the sections not yet designated for discharge and a connecting function for maintaining the discharge distance.

Based on a filter press of the kind described above, this object is achieved in accordance with the invention in such a way that the filter plates, based on the pressing position, can be displaced to a relief position by displacing a filter plate in which the sealing edges of the filter plates are detached from the associated sealing surfaces and in which the coupling elements rest on a blocking surface of the connecting elements which prevents the further horizontal spacing of adjacent filter plates, with the contact of the coupling elements on the blocking surfaces being removable by unlatching the associated connecting elements, so that a further displacement of adjacent filter plates to the discharge position is possible.

After ending the actual filtration process, the opening and discharging process occurs as follows in the press in accordance with the invention:

At first, a relief of all filter plates is achieved by the displacement of the first filter plate (as seen from the pressing plate) and subsequently all further filter plates in such a way that the connecting elements allow an only very small distance of adjacent filter plates, so that a transmission of the tensile force from one filter plate to the next occurs once its distance is merely a few millimeters. This small distance of adjacent filter plates from one another is necessary, however, in order to achieve a relief of the sealing edges of the filter plates which are under a pretension in the pressing position. In the relieved state the sealing edges typically project a few millimeters above the surface of the filter plates in order to achieve the required sealing of the filter chambers in the pressing position of the packet due to the elastic deformation. The transfer of all filter plates from the pressing position to the relief position occurs appropriately for the entire stack of plates in one job step, namely preferably by using the closing cylinder in that the same is moved back by the sum total of the individual relief distances.

The advantage of the solution in accordance with the invention is that with the help of the connecting elements in accordance with the application it is possible to produce an active relief of the sealing edges of the entire stack of plates before the plates of the first section are brought to the discharge distance. This active relief ensures that the filter plates will all have the same distance with respect to each other as defined by the connecting brackets and that in this position the sealing edges of the filter plates are completely relieved. Only in this way is it possible to prevent that during a "migration" of the discharge section from the first to the last section of the stack of plates an even discharge distance is maintained.

In apparatuses according to the state of the art the discharge distance of the sections emptied at a later time is decreased more and more in such a way that the sealing edges of the associated plates have become relieved less and less by their own power in the case of missing preceding active relief. This relief occurs in apparatuses according to the state of the art at the time at which plates are actually pulled apart to the discharge distance, as a result of which, especially when a plurality of filter plates is concerned, a far from inconsiderable measure of length is obtained by addition which reduces the available discharge distance. One must consider that the sections to be emptied, with the exception of the first section, are disposed right in the middle of the stack of filter plates and thus a displacement of the entire stack of plates by providing the required discharge distance is usually impossible.

The cake discharge and the removal of the filter plates delimiting the filter cake to the discharge distance as required for this purpose only occurs in a second step, namely by unlatching in a preceding step the connecting elements of the filter plates of the section which is to be discharged as the next one.

After their unlatching, the connecting elements act like elements with an increased length, so that in the case of a renewed tensile load on the filter plates with unlatched connecting elements the same are displaced to discharge distance with respect to each other, with the connecting elements defining said discharge distance and thus also ensuring a permanent interlinking of the filter plates in the discharge position.

Preferably, the filter plates of a first discharged section are pressed together again after the unlatching of the connecting elements of the second section which is to be discharged next so as to keep down the longitudinal extension of the filter press. Within such a discharge principle, a section with filter plates in the discharge distance "passes through" the entire stack of plates from one end to the other, so that its overall length, after the one-time opening of the first section, remains unchanged and the zone of a lower "density" of the filter plates migrates through the stack.

In comparison with known presses in which the stack of plates is not transferred to a relief position with defined plate distances prior to the opening of the first section, but merely the pressure of the closing cylinder is removed and thus a self-relief occurs which is produced by the spring properties of the sealing edges, the advantage as offered by the invention is that during the discharge of all sections there is now a defined discharge distance. As seen from the closing cylinder, there is in the known filter press a self-relief of the sealing edges which decreases continually with increasing distance, which is caused by the fact that the sealing edges of the filter plates which are farther away from the closing cylinder would have to displace, during their extension, in the horizontal direction all previously situated filter plates. The frictional forces of the plate bearings in the press frame, which add up and counteract such an independent plate displacement, will reach a value from a certain number of plates which exceeds the restoring force of the compressed sealing edges even in the pressed position, so that at first there is no self-resetting of the filter plates which are farther away from the closing cylinder despite the pressure relief of the stack of plates.

When the stack of plates migrates through the discharge section, its width decreases continually with rising distance from the closing cylinder, which means also the discharge distance between the filter plates, because the self-restoration of the sealing edges which still substantially occurred in the first section only occurs incompletely or not at all in the sections that are farther away. When plates of an already emptied section are pushed together, they are not pressed together with such a force that the sealing edges are brought to the compressed state again as would be typical for the pressed position in which the closing force is applied by the closing cylinder. As a result, the discharge distance between the filter plates of the sections farther away continually decreases by a certain amount, which will be particularly disadvantageous in cases when it is necessary to intervene with auxiliary apparatuses in the intermediate space between adjacent filter plates in order to ensure a secure discharge of cake or to perform the cleaning of a filter cloth.

As a result of the active tensile relief of the stack of plates with the help of the closing cylinder for example, the setting of a defined distance of the filter plates with respect to one another occurs in the filter press in accordance with the invention. The introduction of a tensile force into only one filter plate is sufficient due to the connecting elements. Based on such a relief state of the stack of filter plates, the same discharge distance between the filter plates is ensured during the subsequent discharge of all sections.

In a preferred embodiment, the connecting elements are embodied as connecting brackets which are each provided with a groove in which the coupling element, which is embodied as a coupling pin, of an adjacent filter plate.

In a further development of the invention it is provided that the connecting elements are held in a swivelable manner and comprise a groove which is offset in its longitudinal direction and is provided with a first section with the blocking surface and a minimal groove width which corresponds to the width of the coupling element with respect to the relief distance and a second section with the stop surface disposed on the face side.

When the connecting elements are each swivelable about the axis of a coupling pin, the same fulfills a double function, namely acting on the one hand as a coupling element in the groove of the connecting element of the subsequent filter plate and, on the other hand, as a bearing element for the connecting element of the filter plate just considered.

According to a further development of the filter press in accordance with the invention, it is proposed that the connecting elements are provided with a first arm with the groove and a second arm which is opposite of the first arm with respect to the swivel axis and which extends above the swivel axis and can be pressed downwardly by means of the unlatching device, so that the coupling element can enter the second section of the groove.

It is further particularly advantageous when the connecting elements are disposed in two mutually parallel planes, with adjacent connecting elements being disposed in different planes. In this way a scaled arrangement of the connecting elements is avoided as is realized in DE 44 28 963 C1.

It is finally provided that the unlatching device is a carriage that is horizontally displaceable in the press frame and that is provided with a runner which is adjustable in the vertical direction. Appropriately, the carriage is additionally provided with a displacement device for the filter plates in order to omit longitudinally extending actuating elements as would otherwise possibly be required in connection with a stationary displacement device.

BRIEF DESCRIPTION OF THE DRAWINGS

The invention is now explained in closer detail by reference to the embodiment of a filter press as shown in the drawings, wherein:

FIG. 3 shows a view as in FIG. 2, but in the unlatched position of the connecting brackets and with a filter plate which is moved to discharge distance.

DETAILED DESCRIPTION OF THE INVENTION

Figure 1:
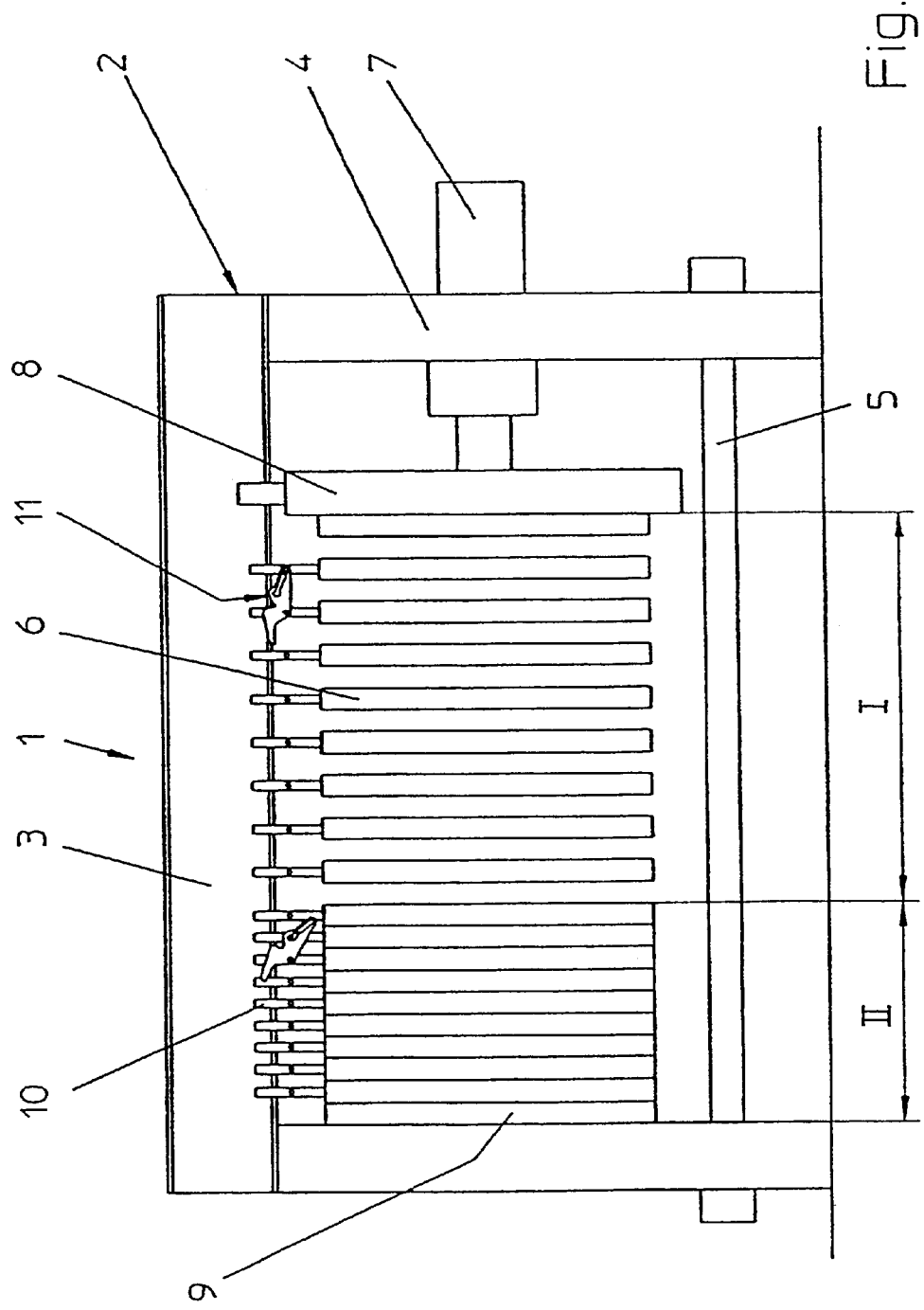
FIG. 1 shows a side view of a filter press with a closed section (II) and an opened section (I)

A filter press 1 as shown in FIG. 1 comprises a press frame 2 which consists of two longitudinal beams 3, a front stanchion 4, a rear stanchion 4 with a support plate 9 as well as two lower tie rods 5 extending parallel to the longitudinal beams 3.

A plurality of filter plates 6 is suspended between the stanchions 4 and on the longitudinal beams 3 and is held in a horizontally displaceable manner. A respective filter chamber is disposed or formed between each adjacent pair of said filter plates 6, which filter chamber is hermetically sealed from the ambient environment in the compressed state of the filter plates 6 due to circumferential sealing edges (not shown in closer detail). A pneumatically actuated closing cylinder 7 can be used to compress the filter plates 6 into a closed packet in the direction of the support plate stanchion with the help of a pressing plate 8 which is suspended on the longitudinal beams 3 and is horizontally displaceable.

All plates 6 are mutually coupled in the zone of supports 10 disposed above the same with the help of connecting elements 11 in the form of connection brackets, so that a continuous concatenation ranging from the pressing plate 8 to the last filter plate 6 which is upstream of the support plate 9 is created. At least one of the connecting elements 11 is respectively provided for each respective one of the plates 6.

FIG. 1 shows the connection bracket by way of example in a highly schematic way and not true to scale.

FIG. 1 shows a right first section I of the filter plates 6 in the discharging position to which the plates 6 are transferred by reversing the pressing plate 8 by means of the closing cylinder 7, starting from the pressing position. Conversely, the filter plates 6 of the left section II are still situated in a so-called relief position which will be explained in detail below.

Figure 2:
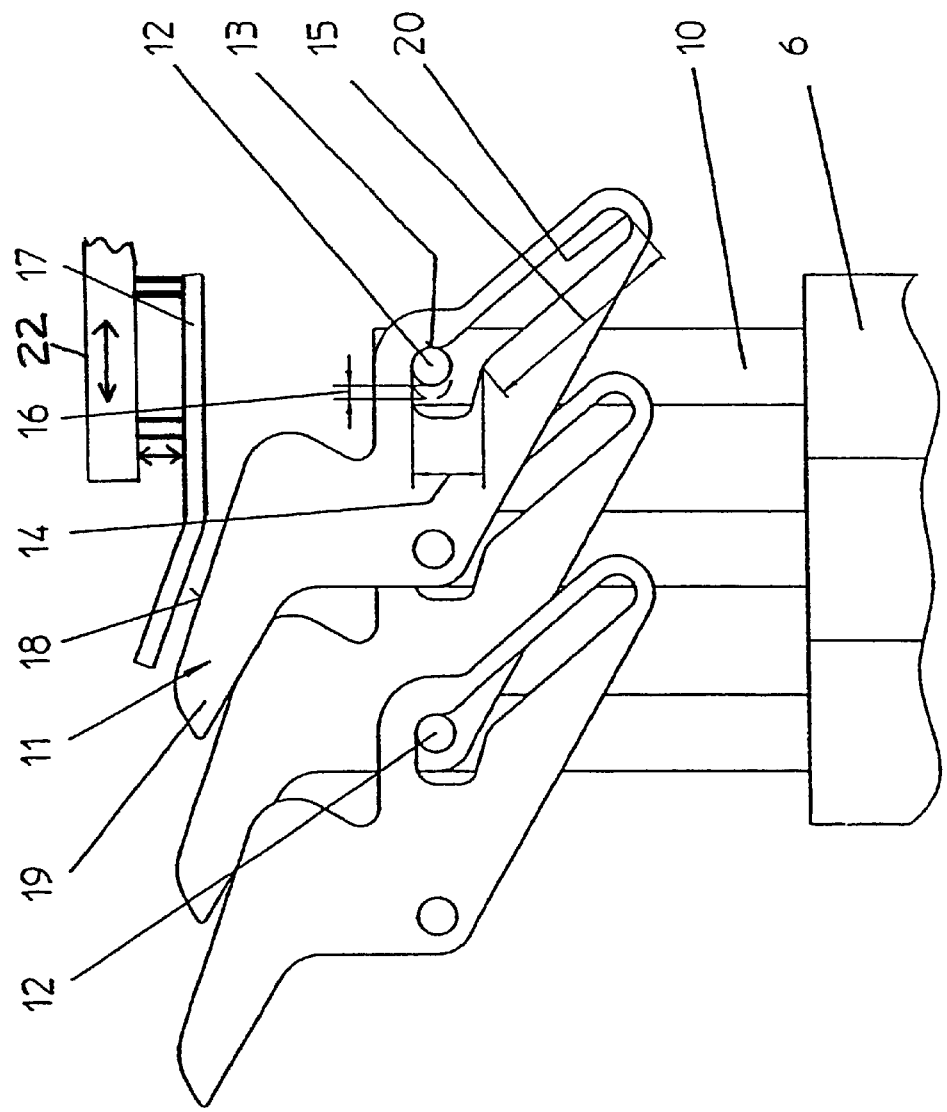
FIG. 2 shows connecting brackets in the relieved position of the filter plates.

FIG. 2 shows three filter plates 6 with three connecting elements which are disposed in the zone of the supports 10, with the filter plates 6 and the connecting elements 11 being situated in the so-called relief position. In said relief position the coupling elements 12 which are arranged as coupling pins rest on a blocking surface 13 of the connecting element 11. The blocking surface 13 is formed by the interior surface of a groove which comprises a first wide and short section 14 and a second long and narrower section 15.

As long as the stack of filter plates is situated in the pressing position, its coupling pin 12 is disposed approximately in the center (relating to the width) of the section 14 of the groove in the connecting element 11. On the left side it does not rest in this position on the associated inner surface of the groove because it needs to be ensured under all circumstances that the stack of filter plates be compressed into a block, so that the compressed sealing edges are able to build up a sufficient sealing force.

Based on this pressing position, a displacement of the coupling pin 12 in the section 14 of the groove is produced by applying a tensile force on a filter plate 6 which is disposed farther to the right for such a time until the coupling pin 12 rests on the right side on the blocking surface 13, so that a further removal of an adjacent filter plate 6 is no longer possible, but instead the applied tensile force is transmitted onto the next following filter plates 6. Based on the pressing plate 8, the entire stack of filter plates can be relieved in this manner so that all coupling pins 12 rest on the blocking surfaces 13 of the associated connecting elements 11. The sealing edges (not shown) are completely relieved or retracted and no longer rest on the associated sealing surfaces of the filter plates 6. The relief distance 16 between two adjacent filter plates 6 is so small that the same was not illustrated for the filter plates 6 in FIG. 2 below.

Based on the blocked position of the connecting elements 11 as shown in FIG. 2, the same are unlocked with the help of a runner 17 of a carriage-like unlatching device 22 (shown schematically) by pressure on a switching surface 18 of a left upper arm 19 of a respective one of the connecting elements 11. The carriage 22 is horizontally displaceable in the press frame, and the runner 17 is adjustable in the vertical direction, as schematically represented by double-headed arrows. The connecting element 11 is swivelled in this process about the coupling pin 12 of the associated filter plate 6, so that the unlatching position is assumed as shown in FIG. 3 at the connecting elements disposed in said illustration on the left-hand side. The blocking surface 13 is pushed upwardly past the coupling pin, as a result of which the coupling pin 12 comes into the inlet zone of the section 15 of the groove in the connecting element 11.

If a tensile force is exerted on a coupling pin 12 thus arranged by an upstream filter plate 6 or its connecting element 11, the same enters the section 15 of the groove and produces thereby a further rotation of the connecting element 11 in a counter-clockwise manner. This rotation is completed when the connecting pin 12 has reached the stop surface 20 at the end of section 15 of the groove. At this time the two filter plates 6 which are mutually coupled by the connecting element are spaced apart at the maximum distance, which means that they are at their discharging distance. One edge 21 of the connecting element 11 is disposed in this position in an approximately horizontal fashion.

Based on this position of the filter plates 6, a displacement away from one another of the filter plates 6 which are disposed farther to the left is produced by a further displacement of the filter plate 6 which is shown farthest to the right.

Based on a pressing position of the entire stack of plates, the entire stack is brought to the relief position first by active tensile relief with the help of the closing cylinder 7 in which all coupling pins 12 rest on the associated blocking surfaces 13. Based on this relief position, the connecting elements 11 are unlatched section by section with the help of the unlatching device, which is why a transfer of the filter plates 6 of the unlatched first section to the discharge position is possible by a renewed application of tensile force on the pressing plate 8. In said discharge position all coupling pins 12 of the unlatched section I rest on the stop surfaces 20 of the connecting elements 11.

After the discharge of the right section I there is also an unlatching of the left section II and thereafter a pulling apart of the filter plates 6 of said section II by means of a sliding device (not shown). Simultaneously with the pulling apart of the filter plates 6 of the section II, which occurs with the help of a displacement device (not shown in closer detail), the filter plates 6 of the previously discharged section I are pushed together again. In the case of a filter press containing more than two sections this process is repeated until all sections are discharged.

What is claimed is:

1. A filter press (1) comprising:
    a stack of vertically aligned, horizontally displaceable filter plates (6) having sealing edges and sealing surfaces,
    a plurality of connecting brackets (11) that each respectively have a groove therein and that are respectively connected to respective ones of the filter 8 plates, and
    a plurality of coupling pins (12) that protrude from the filter plates and that each respectively engage in the groove of a respective one of the connecting brackets that is connected to: an adjacent one of the filter plates,
    so that adjacent pairs of the filter plates (6) are mutually coupled via at least one of the connecting brackets (11) each and define a respective filter chamber therebetween,
    with the filter plates (6) lying against one another with the sealing edges thereof contacting the sealing surfaces of adjacent ones of the filter plates in a pressing position of the stack of filter plates and, starting from the pressing position, the filter plates are displaceable successively to a discharge position by a horizontal displacement of at least one of the filter plates (6) in which a horizontal spacing distance of adjacent ones of the filter plates (6) is limited by an action of the coupling pin of a given one of the filter plates (6) contacting on a stop surface (20) of the groove of the connecting bracket (11) of an adjacent one of the filter plates (6) adjacent to the given filter plate,
    wherein the filter plates (6), starting from the pressing position, can be displaced to a relief position in which the sealing edges of the filter plates (6) are detached from the sealing surfaces of respective adjacent ones of the filter plates and in which the coupling pins (12) respectively contact on blocking surfaces (13) of the grooves of the connecting brackets (11) which prevents further horizontal spacing of adjacent ones of the filter plates,
    with the contacting of the coupling pins (12) on the blocking surfaces (13) being removable by unlatching the connecting brackets (11), so that a further displacement of adjacent ones of the filter plates (6) to the discharge position is possible.

2. The filter press as claimed in claim 1, wherein the connecting brackets (11) are held in a swivelable manner about a swivel axis, and each one of the grooves is offset in its longitudinal direction and includes a first section (14) having the blocking surface (13) and a minimal groove width that corresponds to a width of the coupling pin (12) plus a relief distance (16), and a second section (15) having the stop surface (20) disposed at an end thereof.

3. The filter press as claimed in claim 2, wherein each one of the connecting brackets (11) is swivelable about an axis of a respective one of the coupling pins.

4. The filter press as claimed in claim 2, further comprising an unlatching device, wherein the connecting brackets (11) each include a first arm with the groove therein and a second arm which is opposite the first arm with respect to the swivel axis and which extends above the swivel axis and can be pressed downwardly by means of the unlatching device, so that the coupling pin (12) can enter the second section (15) of the groove.

5. The filter press as claimed in claim 4, wherein the unlatching device comprises a carriage which is horizontally displaceable in a press frame, and a runner (17) which is adjustably connected to the carriage so as to be adjustable in a vertical direction.

6. The filter press as claimed in claim 1, wherein the connecting brackets (11) are disposed in two mutually parallel planes, with adjacent ones of the connecting brackets (11) being disposed in different ones of the planes.

7. A filter press (1) comprising:
    a press frame,
    a stack of vertically aligned, horizontally displaceable filter plates (6) having sealing edges and s sealing surfaces,
    an unlatching device,
    a plurality of connecting elements (11) that are respectively connected to respective ones of the filter plates, and
    a plurality of coupling elements (12) that are connected to the filter plates and that each respectively engage with a respective one of the connecting elements that is connected to an adjacent one of the filter plates,
    so that adjacent pairs of the filter plates (6) are mutually coupled via at least one of the connecting elements (11) each and define a respective filter chamber therebetween,
    with the filter plates (6) lying against one another with the sealing edges thereof contacting the sealing surfaces of adjacent ones of the filter plates in a pressing position of the stack of filter plates and, starting from the pressing position, the filter plates are displaceable successively to a discharge position by a horizontal displacement of at least one of the filter plates (6) in which a horizontal spacing distance of adjacent ones of the filter plates (6) is limited by an action of the coupling element (12) of a given one of the filter plates (6) contacting on a stop surface (20) of the connecting element (11) of an adjacent one of the filter plates (6) adjacent to the given filter plate,
    wherein the filter plates (6), starting from the pressing position, can be displaced to a relief position in which the sealing edges of the filter plates (6) are detached from the sealing surfaces of respective adjacent ones of the filter plates and in which the coupling elements (12) respectively contact on blocking surfaces (13) of the connecting elements (11) which prevents further horizontal spacing of adjacent ones of the filter plates,
    with the contacting of the coupling elements (12) on the blocking surfaces (13) being removable by unlatching the connecting elements (11) with the unlatching device, so that a further displacement of adjacent ones of the filter plates (6) to the discharge position is possible,
    wherein the unlatching device comprises a carriage which is horizontally displaceable in the press frame, and a runner which is connected to the carriage so as to be adjustable in a vertical direction.

8. A filter press comprising:
- a stack of filter plates including a first filter plate and a second filter plate, which are arranged parallel and adjacent to one another, and at least one of which is movable relatively toward and away from the other;
- a coupling pin connected to and extending from said first filter plate; and
- a connecting bracket that is movably connected to said second filter plate and that has a groove therein, into which groove said coupling pin is movably engaged so as to movably couple together said first and second filter plates with said connecting bracket and said coupling pin;
- wherein said groove includes a first groove portion into which said coupling pin can move to enable said first and second filter plates to be relatively moved into contact with each other in a pressing position,
- wherein said groove further includes a stop surface against which said coupling pin can move to enable said first and second filter plates to be relatively moved apart from each other in an open discharge position whereby said coupling pin contacting against said stop surface limits a maximum spacing distance between said first and second filter plates in said open discharge position,
- wherein said groove further includes an intermediate blocking surface which is located between said first groove portion and said stop surface and against which said coupling pin can move to enable said first and second filter plates to be relatively moved into a compression relief position between said pressing position and said open discharge position whereby said coupling pin contacting against said intermediate blocking surface limits an intermediate spacing of said first and second filter plates relative to one another in said compression relief position, and
- wherein said contacting of said coupling pin against said intermediate blocking surface is releasable, to enable said coupling pin to move to said stop surface, by moving said connecting bracket relative to said second filter plate to which said connecting bracket is movably connected.

9. The filter press according to claim 8, wherein said groove further includes a second groove portion that extends longitudinally from and is longer than said first groove portion, said stop surface is located at an end of said second groove portion opposite said first groove portion, and said intermediate blocking surface is formed at an offset between said first groove portion and said second groove portion.

10. The filter press according to claim 8, wherein said connecting bracket is pivotally connected to said second filter plate at a pivot axis, to allow said connecting bracket to move pivotally about said pivot axis relative to said second filter plate.

11. The filter press according to claim 10, wherein said coupling pin connected to and extending from said first filter plate is a first coupling pin, further comprising a second coupling pin connected to and extending from said second filter plate, wherein said connecting bracket is pivotally connected by said second coupling pin to said second filter plate, and wherein said second coupling pin extends axially along said pivot axis.

12. The filter press according to claim 10, further comprising an unlatching device positioned to contact and pivot said connecting bracket about said pivot axis relative to said second filter plate, so as to release said contacting of said coupling pin against said intermediate blocking surface to enable said coupling pin to move to said stop surface, to enable said filter plates to move from said compression relief position to said open discharge position.

13. The filter press according to claim 12, wherein said unlatching device comprises a carriage that is horizontally displaceable relative to said filter plates, and a runner that is vertically adjustably connected to said carriage and positioned so as to contact and pivot said connecting bracket about said pivot axis to enable said filter plates to move from said compression relief position to said open discharge position.

14. The filter press according to claim 8, wherein said stack further includes additional filter plates arranged parallel, adjacent and movable relative to one another, further comprising additional coupling pins respectively connected to and extending from said second filter plate and said additional filter plates, and additional connecting brackets with additional grooves respectively therein, wherein each one of said additional connecting brackets is movably connected to a respective one of said additional filter plates, and each respective one of said additional coupling pins respectively connected to said respective one of said filter plates is respectively engaged in said additional groove of said additional connecting bracket that is connected to a next one of said additional filter plates that is adjacent to said respective one of said additional filter plates.

15. The filter press according to claim 14, wherein all of said connecting brackets are disposed in two parallel planes, with adjacent ones of said connecting brackets being disposed alternately in different ones of said two parallel planes.

* * * * *